US012272514B2

(12) United States Patent
Song et al.

(10) Patent No.: US 12,272,514 B2
(45) Date of Patent: Apr. 8, 2025

(54) ELECTRON GUN

(71) Applicant: SHANGHAI UNITED IMAGING HEALTHCARE CO., LTD., Shanghai (CN)

(72) Inventors: Ruiying Song, Shanghai (CN); Peng Cheng, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 18 days.

(21) Appl. No.: 18/064,280

(22) Filed: Dec. 11, 2022

(65) Prior Publication Data

US 2024/0006142 A1 Jan. 4, 2024

Related U.S. Application Data

(63) Continuation of application No. PCT/CN2020/096230, filed on Jun. 15, 2020.

(51) Int. Cl.
*H01J 3/02* (2006.01)
*H01J 1/02* (2006.01)

(52) U.S. Cl.
CPC .............. *H01J 3/029* (2013.01); *H01J 1/025* (2013.01)

(58) Field of Classification Search
None
See application file for complete search history.

(56) References Cited

U.S. PATENT DOCUMENTS 3,843,902 A * 10/1974 Miram .................... H01J 3/026 313/299
4,227,116 A * 10/1980 Miram .................. H01J 23/065 313/295
4,994,709 A 2/1991 Green et al.
5,936,335 A 8/1999 Clerc
5,990,608 A 11/1999 Shiroishi
2016/0056006 A1 2/2016 Allen et al.
2016/0056007 A1 2/2016 Allen et al.
2019/0272969 A1 9/2019 Allen
2020/0395185 A1* 12/2020 Kimura .................. H01J 3/027

FOREIGN PATENT DOCUMENTS

CN 202857121 U 4/2013
JP 11-505059 * 5/1999

OTHER PUBLICATIONS

International Search Report in PCT/CN2020/096230 mailed on Mar. 11, 2021, 4 pages.
Written Opinion in PCT/CN2020/096230 mailed on Mar. 11, 2021, 4 pages.

* cited by examiner

*Primary Examiner* — Ashok Patel
(74) *Attorney, Agent, or Firm* — METIS IP LLC

(57) ABSTRACT

An electron gun may include a cathode with an emitting surface configured to emit electrons. The cathode may include a through hole that goes through the emitting surface and is configured to allow back-streaming electrons of the emitted electrons to pass through. The electron gun may also include an anode configured to attract the emitted electrons from the cathode to the anode and focus the emitted electrons into an electron beam. The electron gun may also include a grid structure configured to facilitate the focusing of the emitted electrons, the grid structure being positioned corresponding to the through hole.

18 Claims, 3 Drawing Sheets

100

ELECTRON GUN

CROSS-REFERENCE TO RELATED APPLICATIONS

This application is a continuation of International Application No. PCT/CN2020/096230, filed Jun. 15, 2020, the contents of which are incorporated herein by reference to their entirety.

TECHNICAL FIELD

The present disclosure generally relates to an electron gun, and in particular, to an electron gun including a hollow cathode and a grid structure that are configured to reduce or eliminate back-streaming electrons on the cathode.

BACKGROUND

Electron guns are of two types. The first type of electron guns is a diode electron gun including two electrodes, such as a cathode and an anode. The second type of electron guns is a triode electron gun including three electrodes, such as a cathode, an anode, and a grid electrode.

SUMMARY

According to an aspect of the present disclosure, an electron gun may include a cathode with an emitting surface configured to emit electrons. The cathode may include a through hole that goes through the emitting surface and is configured to allow back-streaming electrons of the emitted electrons to pass through. The electron gun may also include an anode configured to attract the emitted electrons from the cathode to the anode and focus the emitted electrons into an electron beam. The electron gun may also include a grid structure configured to facilitate the focusing of the emitted electrons, the grid structure being positioned corresponding to the through hole.

In some embodiments, at least one of the cathode, the through hole, the grid structure, or the anode may be centered on a common axis of the electron gun.

In some embodiments, a projection of at least a portion of the gird structure along the common axis may be within a cross-section of the through hole vertical to the common axis.

In some embodiments, the grid structure may be provided with a same voltage as the cathode.

In some embodiments, the grid structure may include a plurality of first meshes through which the back-streaming electrons of the emitted electrons pass.

In some embodiments, the plurality of first meshes may relate to a count of the back-streaming electrons passing through the grid structure and the focusing of the electrons emitted from the cathode.

In some embodiments, the grid structure may be in contact with the cathode.

In some embodiments, there may be a gap between the grid structure and the cathode.

In some embodiments, the grid structure may be supported by a grid supporter.

In some embodiments, the cathode may include a first material configured to facilitate the emission of the electrons from the cathode by lowering a work function of the cathode.

In some embodiments, the grid structure may include a second material that is chemically reactive with the first material.

In some embodiments, the first material may include barium (Ba), and the second material includes a transition metal including at least one of zirconium (Zr) or hafnium (Hf).

In some embodiments, the second material may be configured to prevent emission of electrons from the grid structure caused by an impact of at least a portion of the back-streaming electrons on the grid structure.

In some embodiments, the electron gun may include a grid electrode configured to control flow of the electrons emitted from the cathode to the anode. The grid electrode may be positioned between the cathode and the anode.

In some embodiments, the grid electrode may be centered on the common axis of the electron gun.

In some embodiments, the grid electrode may include a plurality of second meshes configured to allow the electrons emitted from the cathode or the back-streaming electrons to pass through.

In some embodiments, the plurality of second meshes may include a center mesh corresponding to the through hole. The center mesh may be configured to allow the back-streaming electrons of the emitted electrons to pass through and prevent the back-streaming electrons from impacting the grid electrode. The center mesh may be centered on the common axis.

In some embodiments, the grid electrode may include a third material that is chemically reactive with the first material.

In some embodiments, the grid structure may be positioned at a fixed location between the cathode and the grid electrode.

In some embodiments, the grid structure may be adjustable along the common axis between the cathode and the grid electrode.

In some embodiments, the electron gun may include an energy source configured to provide energy to the cathode enabling the emission of the electrons from the cathode.

In some embodiments, the electron gun may include an electron reception device configured to receive the back-streaming electrons of the emitted electrons that pass through the through hole of the cathode.

In some embodiments, the electron gun may include a focusing electrode configured to focus the emitted electrons into the electron beam.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
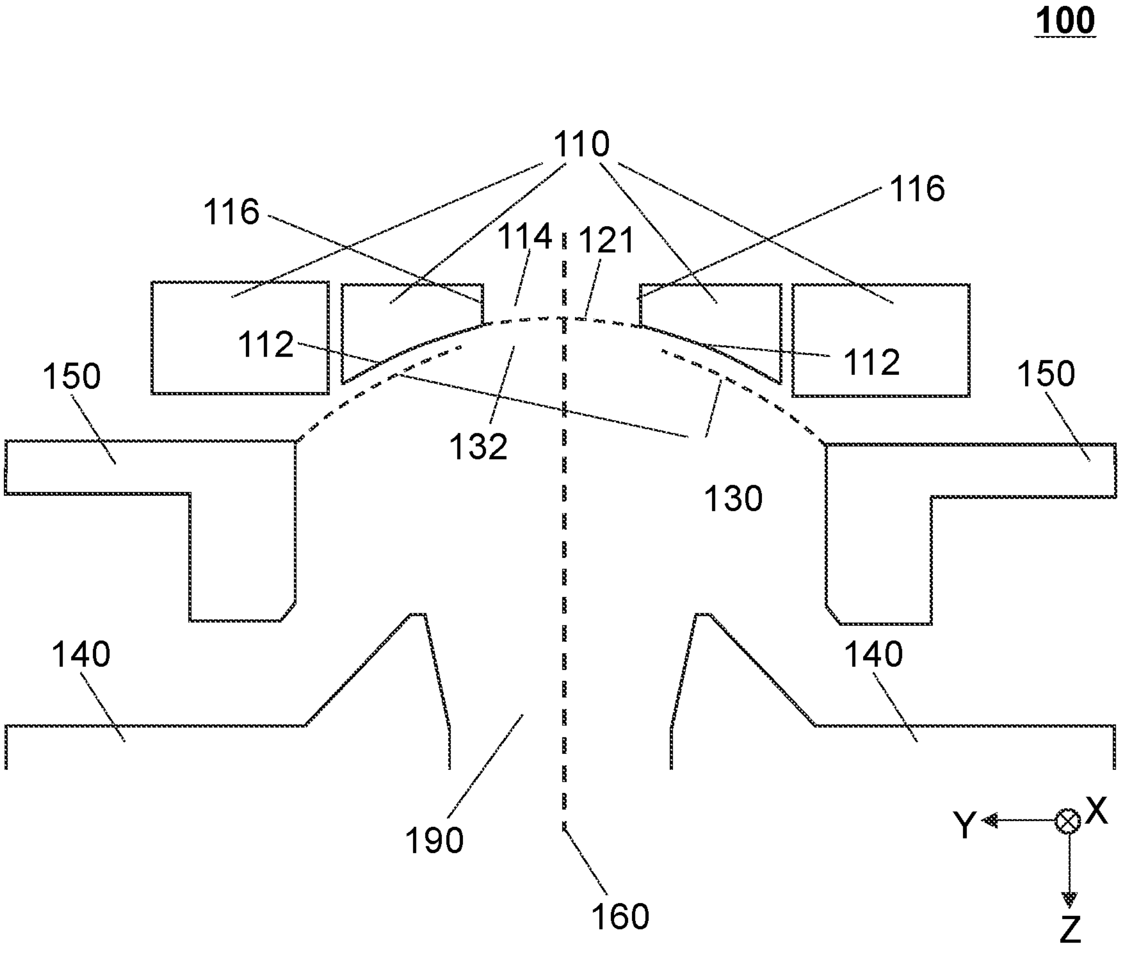
FIGS. 1 and 2 are schematic diagrams illustrating a cross-sectional view of an exemplary triode electron gun according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

A linear particle accelerator, or referred to as a Klystron, uses a source of an electron beam that is typically known as an electron gun. In some cases, for example, when the electron gun is used as an electron source in an electron linear accelerator, a portion of electrons output from the electron gun, referred to as back-streaming electrons, may travel back to the electron gun. The back-streaming electrons may adversely impact the cathode of the electron gun by causing, e.g., overheating of the cathode, which in turn may reduce the lifetime of the cathode, reducing the performance of the cathode, etc. Therefore, it is desirable to provide an electron gun to alleviate or solve an impact of the back-streaming electrons on the cathode.

An aspect of the present disclosure relates to an electron gun including a hollow cathode. The electron gun may include a cathode and an anode. Optionally, the electron gun may further include a grid electrode. The cathode may include a through hole configured to allow back-streaming electrons to pass through. With the through hole, the back-streaming electrons may go through the through hole, instead of impinging on the cathode, thereby avoiding overheating of the cathode. The electron gun may further include a grid structure configured to facilitate focusing of the electrons emitted from the cathode. The grid structure may be positioned between the cathode and the anode. The grid structure may be positioned corresponding to the through hole. A projection of at least a portion of the gird structure along the common axis may be within a cross-section of the through hole vertical to the common axis. An electric field between the cathode and the anode formed based on a discontinuous emitting surface of the cathode caused by the through hole may focus the electrons emitted from the cathode into an electron beam with relatively poor convergence. With the grid structure, an electric field between the cathode and the anode may focus the electrons emitted from the cathode into an electron beam with better convergence than without the grid structure.

Figure 2:
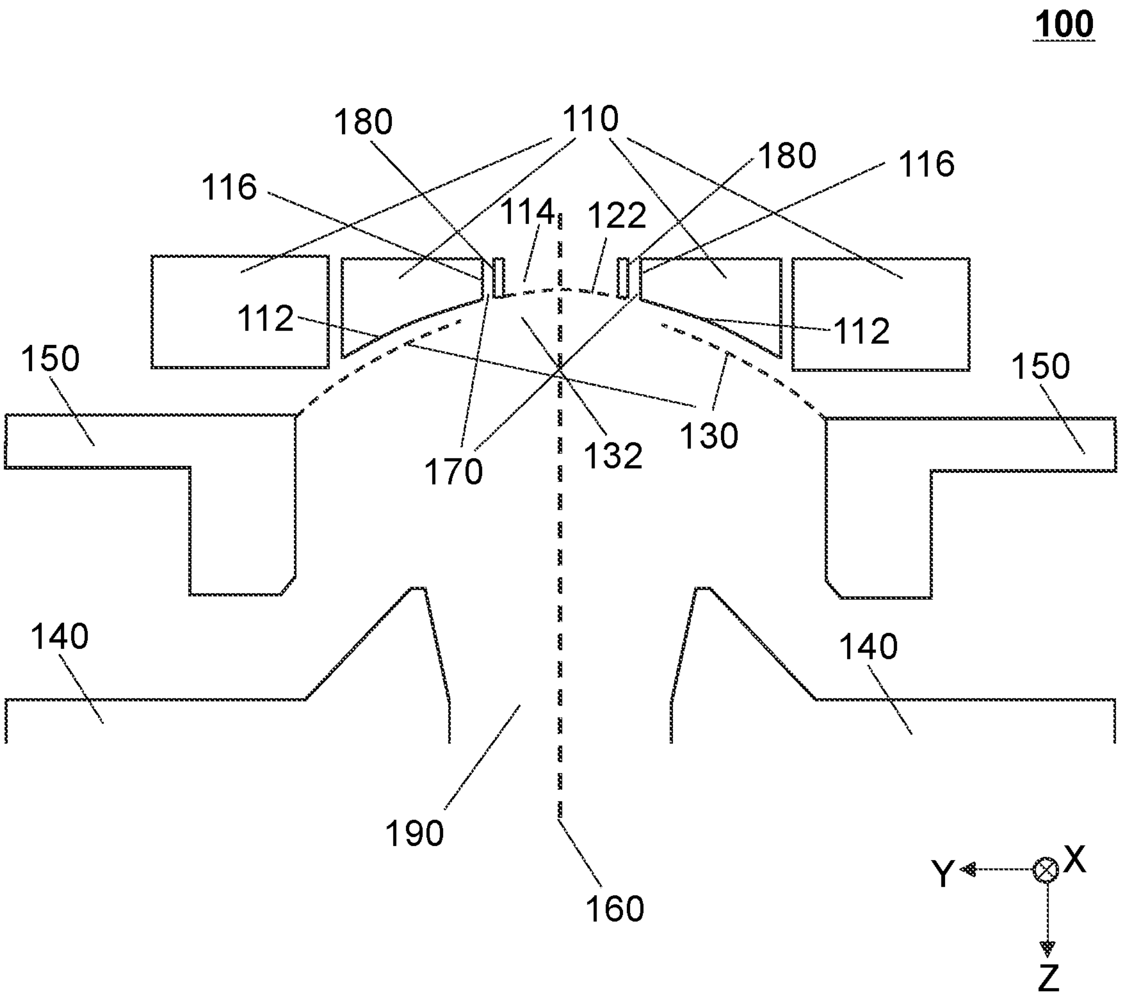

FIGS. 1 and 2 are schematic diagrams illustrating a cross-sectional view of an exemplary triode electron gun according to some embodiments of the present disclosure. The electron gun 100 may include a cathode 110, a grid structure (e.g., a grid structure 121 in FIG. 1 or a grid structure 122 in FIG. 2), a grid electrode 130, and an anode 140. In some embodiments, the cathode 110, the grid electrode 130, and the anode 140 may be centered on a common axis 160 of the electron gun 100. In some embodiments, the electron gun 100 may further include at least one of a focusing electrode 150, an energy source (not shown), and a reception device (not shown). In some embodiments, the focusing electrode 150 may be centered on the common axis 160. In some embodiments, along an emitting direction of electrons emitted from the cathode 110, the anode 140 may be positioned downstream from the cathode 110. The grid electrode 130 may be positioned between the cathode 110 and the anode 140. The focusing electrode 150 may be positioned between the grid electrode 130 and the anode 140.

In the present disclosure, the X axis, the Y axis, and the Z axis shown in FIG. 1 may form an orthogonal coordinate system. As illustrated, the Z axis may be parallel to the common axis 160. The positive Z direction along the Z axis may be from the cathode 110 to the anode 140. The positive Y direction along the Y axis may be from the right side to the left side of the electron gun 100 seen from the negative Z direction. In FIG. 1, for the purpose of illustration, the X axis may be described as vertical to the paper. The positive X direction along the X axis may be from the upper side to the lower side of the electron gun 100 seen from the negative Z direction. The X axis, the Y axis, and the Z axis shown in FIG. 2 may be similar to those in FIG. 1. FIGS. 1 and 2 illustrates a cross-section of the electron gun 100 parallel to the Y-Z plane.

The cathode 110 may include an emitting surface 112 configured to emit electrons. In some embodiments, the emitting surface 112 may face the anode 140. The emitting surface 112 may be a flat surface or a curved surface (e.g., a concave surface as shown in FIG. 1). In some embodiments, the emitting surface 112 may be centered on the common axis 160.

When the temperature of metal increases, the kinetic energy of electrons in the metal may increase accordingly. When the temperature increases to a certain value, a large number (or count) of electrons may overcome the work function of the metal and escape from the metal. This phenomenon is called thermionic emission. In some embodiments, the cathode 110 may be so hot that it emits electrons from the emitting surface 112 by thermionic emission.

In some embodiments, the cathode 110 (e.g., the emitting surface 112) may include a metal material, such as tungsten (W), an alloy thereof, etc. By heating the cathode 110, outer electrons of atoms of the metal material may be excited by a certain energy. The excited electrons may overcome the work function of the metal material and go out of the orbital bond, and become free electrons to be emitted from the cathode 110 (e.g., the emitting surface 112). The energy needed for electrons to escape from the cathode 110 may be referred to as the work function of the cathode 110. In some embodiments, the cathode 110 may further include a first material, such as barium (Ba), configured to facilitate the emission of the electrons from the cathode 110 by lowering the work function of the cathode 110. In some embodiments, the cathode 110 may be impregnated with the first material.

The electrons emitted from the cathode 110 (also referred to as the emitted electrons) may flow out of the electron gun 100 by the attraction of the anode 140. In some cases, a portion of the emitted electrons, referred to as back-streaming electrons, may travel back to the electron gun 100. For example, when the electron gun 100 is used as an electron source of an electron linear accelerator, the electron linear accelerator may be operably connected to the anode 140. The emitted electrons may enter the electron linear accelerator from the electron gun 100 through the anode 140. Since the frequency that the emitted electrons are injected into the electron linear accelerator from the electron gun 100 is not synchronized with the frequency of acceleration field (e.g., an electric field or an electromagnetic field) that is used to accelerate the emitted electrons and applied to the electron linear accelerator, some of the emitted electrons may be accelerated in a direction opposite to the emitting direction of the emitted electrons from the cathode 110, and may travel back to the electron gun 100. It should be noted that the electron gun provided in the present disclosure may also be applied to reduce or eliminate back-streaming electrons caused by other reasons.

Assuming that the cathode 110 is solid, the back-streaming electrons may impinge on the cathode 110, for example, in a region of the emitting surface 112 centered on the common axis 160. The back-streaming electrons impinging on the cathode 110 may cause the temperature of the cathode 110 to increase, thereby causing the cathode 110 to overheat. The overheating of the cathode 110 may cause many problems. For example, the evaporation rate of the first material in the cathode 110 may increase with increasing temperature. Therefore, the overheating of the cathode 110 may accelerate the evaporation rate of the first material, thereby reducing the lifetime of the cathode 110. As another example, the evaporative first material may deposit on the inner wall of the electron linear accelerator. The deposited first material may lower the work function of the inner wall of the electron linear accelerator and accordingly cause some electrons to be emitted from the inner wall of the electron linear accelerator. The electrons emitted from the inner wall of the electron linear accelerator may form a "dark current" under the effect of the electric field gradient inside the electron linear accelerator, consuming the power of the electron linear accelerator.

In some embodiments of the present disclosure, as shown in FIG. 1, the cathode 110 may be a hollow cathode including a first through hole 114 that goes through the emitting surface 112 and is configured to allow the back-streaming electrons of the emitted electrons to pass through. The first through hole 114 may extend along the common axis 160 and traverse the cathode 110. With the first through hole 114, the back-streaming electrons may go through the first through hole 114, instead of impinging on the cathode 110, thereby reduding or avoiding the overheating of the cathode 110 by the back-streaming electrons.

In some embodiments, the position of the first through hole 114 in the cathode 110, the size of the first through hole 114, and the shape of the first through hole 114 may be configured so that most (e.g., at least 90%) of the back-streaming electrons of the emitted electrons pass through the first through hole 114, instead of impinging on the cathode 110. For example, the first through hole 114 may be centered on the common axis 160. As another example, the first though hole 114 may be a cylinder of which the cross-section parallel to the X-Y plane is a circle.

Due to different voltages on the components (e.g., the cathode 110, the grid electrode 130, the focusing electrode 150, the anode 140, etc.) in the electron gun 100, an electric field including curved equipotential surfaces and/or electric field lines may form between the cathode 110 and the anode 140, which may change a trajectory of the emitted electrons from the cathode 110 to the anode 140, leading to convergence and/or divergence of the emitted electrons, thereby achieving focusing of the emitted electrons into an electron beam. The emitted electrons may exit the electron gun 100 in the form of an electron beam.

The electric field between the cathode 110 and the anode 140 formed based on the discontinuous emitting surface 112 with a hole corresponding to the first through hole 114 may focus the emitted electrons into an electron beam with relatively poor convergence. In order to improve the focusing of the emitted electrons, the grid structure may be applied in the electron gun 100.

The grid structure may be configured to facilitate the focusing of the emitted electrons. In some embodiments, the grid structure may be positioned between the cathode 110 and the anode 140. In some embodiments, the grid structure may be positioned corresponding to the first through hole 114. In some embodiments, the grid structure may be or not be coaxial with the first through hole 114. For example, the first through hole 114 and the grid structure may be centered on the common axis 160. In some embodiments, a projection of at least a portion of the gird structure along the negative Z direction may be within the cross-section of the first through hole 114 parallel to the X-Y plane. For example, a projection of the entire gird structure along the negative Z direction may be within the cross-section of the first through hole 114 parallel to the X-Y plane. As another example, a projection of a first portion of the gird structure along the negative Z direction may be within the cross-section of the first through hole 114 parallel to the X-Y plane, while a projection of a second portion of the gird structure along the negative Z direction may be outside the cross-section of the first through hole 114 parallel to the X-Y plane.

The grid structure may improve the poor convergence caused by the discontinuous emitting surface 112 with a hole corresponding to the first through hole 114. With the grid structure, the electric field between the cathode 110 and the anode 140 may focus the emitted electrons into an electron beam with better convergence than without the grid structure.

In some embodiments, the grid structure may include a first grid frame and a plurality of first meshes through which the back-streaming electrons of the emitted electrons may pass. The first grid frame may include a plurality of crossed lines (e.g., wires). The plurality of first meshes may be defined by the first grid frame.

Figure 3:
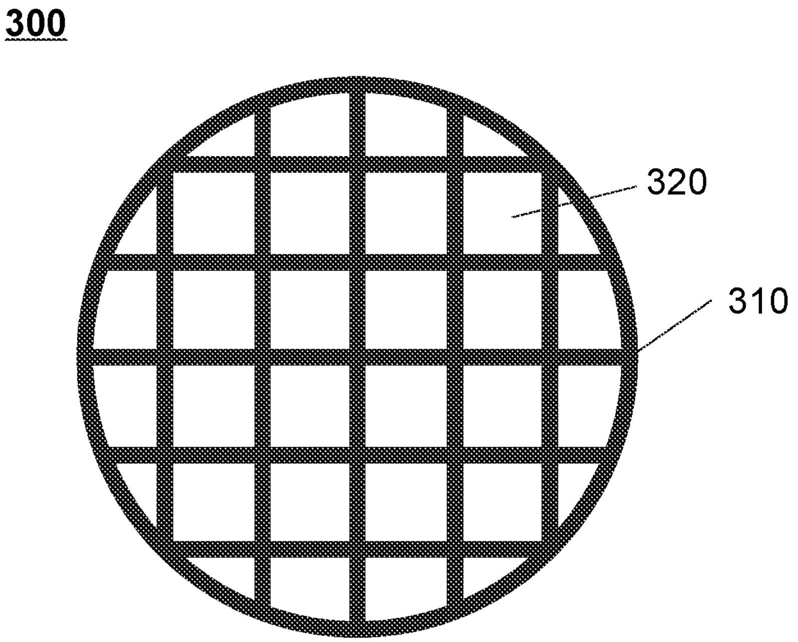
FIG. 3 is a schematic diagram illustrating an exemplary grid structure according to some embodiments of the present disclosure.

Merely by way of example, FIG. 3 is a schematic diagram illustrating an exemplary grid structure according to some embodiments of the present disclosure. FIG. 3 illustrates a view of a grid structure 300 seen from the positive or negative Z direction in FIG. 1 or FIG. 2. As illustrated, the grid structure 300 may include a first grid frame 310 and a plurality of first meshes (e.g., mesh 320) through which the back-streaming electrons of the emitted electrons may pass. The first grid frame 310 may include a plurality of crossed lines (e.g., wires).

In some embodiments, a grid pattern of the grid structure determined based on the first grid frame and the plurality of first meshes may indicate the size of each of the plurality of first meshes, the shape of each of the plurality of first meshes, a count of the plurality of first meshes, a total area of the plurality of first meshes, the thickness of the crossed lines formed the first grid frame, a density of the plurality of first meshes in the grid structure (e.g., a count of the first meshes per unit area in the grid structure), or the like, or any combination thereof. In some embodiments, the larger the size of the plurality of first meshes is, the more back-streaming electrons passing through the grid structure may be, but the worse the focusing performance of the grid structure may be. The grid pattern of the grid structure may be configured so that most (e.g., at least 60%, at least 70%, at least 80%, at least 90%, etc.) of the back-streaming electrons of the emitted electrons pass through the grid structure, instead of impinging on the first grid frame of the grid structure and the focusing of the electrons emitted leads to an electron beam with satisfactory convergence.

In some embodiments, the grid structure may be provided with a same voltage as the cathode 110 to inhibit electron emission from the inner wall 116 of the first through hole 114. In some embodiments, in order to prevent the thermionic emission of the grid structure when the cathode 110 is heated, the grid structure may be thermally isolated from the cathode 110, and/or the work function of the grid structure may be higher than the cathode 110.

In some embodiments, if the evaporative first material from the cathode 110 deposits on the grid structure, the deposited first material may lower the work function of the grid structure. The back-streaming electrons impinging on the first grid frame of the grid structure may increase the temperature of the grid structure and undesirably cause some electrons to be emitted from the grid structure. The grid structure of the electron gun 100 according to embodiments of the present disclosure may include a second material that is chemically reactive with the first material. In some embodiments, if the first material includes Ba, the second material may include a transition metal including at least one of zirconium (Zr) or hafnium (Hf) that are chemically reactive with Ba. The second material may be employed to reduce or eliminate the depositing of the first material on the grid structure and/or emission of electrons from the grid structure caused by the impinging of at least a portion of the back-streaming electrons on the grid structure.

In some embodiments, the grid structure (e.g., the grid structure 121 shown in FIG. 1) may be in contact with the cathode 110. For example, the grid structure may be welded to the cathode 110. In some embodiments, there may be a gap between the grid structure and the cathode 110. For example, as shown in FIG. 2, there may be a gap 170 between the grid structure 122 and the cathode 110. In some embodiments, the grid structure may be mechanically supported by a grid supporter. For example, as shown in FIG. 2, the grid structure 122 may be mechanically supported by a grid supporter 180. The grid supporter 180 may be provided with a same voltage as the cathode 110. In some embodiments, in order to prevent the thermionic emission of the grid supporter 180 when the cathode 110 is heated, the grid supporter 180 may be thermally isolated from the cathode 110 and/or the work function of the grid supporter 180 may be higher than the cathode 110. In some embodiments, in order to reduce or avoid the depositing of the first material on the grid supporter 180 and/or emission of electrons from the grid supporter 180 caused by the impinging of at least a portion of the back-streaming electrons on the grid supporter 180, the grid supporter 180 may include a material that is chemically reactive with the first material. The material may be similar to the second material of the grid structure described elsewhere in the present disclosure, the descriptions of which are not repeated here.

In some embodiments, the grid structure may be positioned between the cathode 110 and the anode 140. In some embodiments, the grid structure may be positioned closer to the cathode 110 relative to the anode 140. In some embodiments, the grid structure may be positioned in a fixed location between the cathode 110 and the anode 140. In some embodiments, the grid structure may be adjustable, e.g., along the common axis 160, between the cathode 110 and the anode 140.

In some embodiments, the grid structure may be positioned between the cathode 110 and the grid electrode 130. In some embodiments, the grid structure may be positioned in a fixed location between the cathode 110 and the grid electrode 130. In some embodiments, the grid structure may be adjustable, e.g., along the common axis 160, between the cathode 110 and the grid electrode 130.

The grid electrode 130 may be configured to control the flow of the emitted electrons from the cathode 110 to the anode 140. For example, if the grid electrode 130 maintains a negative voltage relative to the cathode 110, the electric field between the cathode 110 and the grid electrode 130 may be a decelerating electric field for the emitted electrons. The emitted electrons may escape from the cathode 110 with an initial velocity. Due to the decelerating electric field between the grid electrode 130 and the cathode 110, the electrons with a relatively small initial velocity may be repelled back toward the cathode 110, and the electrons with a relatively large initial velocity may travel to the anode 140. Therefore, the number (or count) of electrons emitted from the cathode 110 to the anode 140 may be controlled by adjusting the voltage of the grid electrode 130. When the grid electrode 130 maintains a sufficiently high negative voltage relative to the cathode 110, all of the emitted electrons may be repelled back to the cathode 110 so that no electron travels to the anode 140. If the voltage of the grid electrode 130 is positive relative to the cathode 110, an accelerating electric field for the emitted electrons may form between the grid electrode 130 and the cathode 110, and the emitted electrons may travel toward the anode 140.

In some embodiments, the grid electrode 130 may be provided with a same voltage as the focusing electrode 150. In some embodiments, if the emitting surface 112 is a concave surface, the grid electrode 130 may include a concave surface that faces the anode 140. The concave surface of the grid electrode 130 and the concave emitting surface 112 may correspond to two concentric circles, respectively.

In some embodiments, the grid electrode 130 may include a second grid frame and a plurality of second meshes configured to allow the emitted electrons from the cathode to pass through and travel to the anode 140, and/or allow the back-streaming electrons to pass through and travel to the cathode 110. The second grid frame may include a plurality of crossed lines (e.g., wires). The plurality of second meshes may be defined by the second grid frame.

In some embodiments, a grid pattern of the grid electrode 130 determined based on the second grid frame and the plurality of second meshes may indicate the size of each of the plurality of second meshes, the shape of each of the plurality of second meshes, a count of the plurality of second meshes, a total area of the plurality of second meshes, the thickness of the crossed lines formed the second grid frame, a density of the plurality of second meshes in the grid electrode 130 (e.g., a count of the second meshes per unit area in the grid electrode 130), or the like, or any combination thereof.

In some embodiments, the grid pattern of a portion of the grid electrode 130 corresponding to the grid structure may be the same as or different from the grid pattern of the grid structure. The portion of the grid electrode 130 corresponding to the grid structure may refer to a region on the grid electrode 130 covered by a projection of the grid structure on the grid electrode 130 along the positive Z direction.

In some embodiments, if the evaporative first material from the cathode 110 deposits on the grid electrode 130, the deposited first material may lower the work function of the grid electrode 130. The back-streaming electrons impinging on the second grid frame of the grid electrode 130 may cause the temperature of the grid electrode 130 to increase and some electrons to be emitted from the grid electrode 130. When the grid electrode 130 is configured to reduce or eliminate the number (or count) of electrons traveling to the anode 140, it may indicate that fewer electrons or no electron is needed to be output from the electron gun 100. In this case, since the anode 140 maintains a positive voltage relative to the grid electrode 130, electrons emitted from the grid electrode 130 caused based on the deposited first material on the grid electrode 130 and the impinging of the back-streaming electrons on the grid electrode 130 may still be attracted by the anode 140 and exit the electron gun 100, thereby leading to an unwanted electron output from the electron gun 100.

The first through hole 114 may alleviate or solve the above problem of the grid electrode 130 by avoiding or reducing the overheating of the cathode 110 caused by the impinging of the back-streaming electrons on the cathode 110.

In some embodiments, in order to further alleviate or solve the above problem of the grid electrode 130, the plurality of second meshes of the grid electrode 130 may include a center mesh 132 that corresponds to the first through hole 114 and is configured to allow the back-streaming electrons to pass through and prevent the back-streaming electrons from impinging on the grid electrode 130. In some embodiments, the center mesh 132 may be coaxial with the first through hole 114. For example, the first through hole 114 and the grid electrode 130 may be centered on the common axis 160. The shape of the center mesh 132 may be the same as or similar to the shape of the cross-section of the first through hole 114 parallel to the X-Y plane, and the size of the center mesh 132 may be equal to, larger than, or smaller than the size of the cross-section of the first through hole 114. Alternatively or additionally, the grid electrode 130 may include a third material that is chemically reactive with the first material. In some embodiments, if the first material includes Ba, the third material may include a transition metal including at least one of zirconium (Zr) or hafnium (Hf) that is chemically reactive with Ba. The third material may be configured to reduce or avoid the depositing of the first material on the grid electrode 130 and/or emission of electrons from the grid electrode 130 caused by an impinging of at least a portion of the back-streaming electrons on the electrode 130.

In some embodiments, when a projection of the entire gird structure along the Z direction extends beyond the first through hole 114, the gird structure may intercept the back-streaming electrons that would otherwise be intercepted by the grid electrode 130, reducing the pressure of intercepting the back-streaming electrons on the grid electrode 130.

The anode 140 may be configured to attract the emitted electrons from the cathode 110 to the anode 140 by maintaining a positive voltage potential relative to the cathode 110. In some embodiments, the anode 140 may be further configured to focus the emitted electrons into an electron beam. In some embodiments, the anode 140 may include a second through hole 190 through which the emitted electrons may exit the electron gun 100. In some embodiments, the second through hole 190 may be centered on the common axis 160.

The focusing electrode 150 may be configured to focus the emitted electrons into an electron beam.

The energy source may be configured to provide energy (e.g., heat energy or electric energy) to the cathode 110 enabling the emission (e.g., thermionic emission) of the electrons from the cathode 110.

The electron reception device may be configured to receive the back-streaming electrons of the emitted electrons that pass through the first through hole 114 of the cathode 110. In some embodiments, the electron reception device may include a metal material that is electrically connected to the ground. In some embodiments, the electron reception device may be positioned upstream to the cathode 110 along the positive Z direction.

In some embodiments, the cathode 110 with the first through hole 114 and the grid structure illustrated in the present disclosure may also be applied in a diode electron gun to alleviate or solve the overheating of the cathode caused by back-streaming electrons impinging on the cathode.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An electron gun, comprising:

a cathode with an emitting surface configured to emit electrons, the cathode including a through hole that goes through the cathode and is configured to allow back-streaming electrons of the emitted electrons to pass through;

an anode configured to attract the emitted electrons from the cathode to the anode and focus the emitted electrons into an electron beam; and a grid structure configured to facilitate the focusing of the emitted electrons, the grid structure being positioned corresponding to the through hole; and a grid electrode including a plurality of first meshes configured to allow the electrons emitted from the cathode or the back-streaming electrons to pass through, wherein the plurality of first meshes include a center mesh corresponding to the through hole, the center mesh is configured to prevent the back-streaming electrons from impacting the grid electrode, and the center mesh is centered on a common axis of the electron gun.

2. The electron gun of claim 1, wherein at least one of: the cathode, the through hole, the grid structure, and the anode is centered on the common axis of the electron gun.

3. The electron gun of claim 2, wherein a projection of at least a portion of the gird structure along the common axis is within a cross-section of the through hole vertical to the common axis.

4. The electron gun of claim 2, wherein the grid structure is provided with a same voltage as the cathode.

5. The electron gun of claim 2, wherein the grid structure includes a plurality of second meshes through which the back-streaming electrons of the emitted electrons pass.

6. The electron gun of claim 5, wherein the plurality of second meshes relate to a count of the back-streaming electrons passing through the grid structure and the focusing of the electrons emitted from the cathode.

7. The electron gun of claim 2, wherein the grid structure is in contact with the cathode or there is a gap between the grid structure and the cathode.

8. The electron gun of claim 2, wherein the grid structure is supported by a grid supporter.

9. The electron gun of claim 2, wherein the cathode includes a first material configured to facilitate the emission of the electrons from the cathode by lowering a work function of the cathode.

10. The electron gun of claim 9, wherein the grid structure includes a second material that is chemically reactive with the first material.

11. The electron gun of claim 10, wherein the second material is configured to prevent emission of electrons from the grid structure caused by an impact of at least a portion of the back-streaming electrons on the grid structure.

12. The electron gun of claim 9, wherein the grid electrode is configured to control flow of the electrons emitted from the cathode to the anode, the grid electrode being positioned between the cathode and the anode.

13. The electron gun of claim 12, wherein the grid electrode is centered on the common axis of the electron gun.

14. The electron gun of claim 12, wherein the grid electrode includes a third material that is chemically reactive with the first material.

15. The electron gun of claim 12, wherein the grid structure is positioned at a fixed location between the cathode and the grid electrode.

16. The electron gun of claim 12, wherein the grid structure is adjustable along the common axis between the cathode and the grid electrode.

17. The electron gun of claim 1, wherein at least a portion of the grid structure is positioned within the through hole.

18. The electron gun of claim 1, wherein the through hole extends along the common axis of the electron gun from the cathode to the anode or from the anode to the cathode.

* * * * *